US009901917B2

(12) United States Patent
Kei et al.

(10) Patent No.: US 9,901,917 B2
(45) Date of Patent: Feb. 27, 2018

(54) ENCLOSED-CHANNEL REACTOR METHOD TO MANUFACTURE CATALYSTS OR SUPPORT MATERIALS

(71) Applicant: National Applied Research Laboratories, Hsinchu (TW)

(72) Inventors: Chi-Chung Kei, Hsinchu (TW); Bo-Heng Liu, Hsinchu (TW); Chien-Pao Lin, Hsinchu (TW); Chien-Nan Hsiao, Hsinchu (TW); Yang-Chih Hsueh, Hsinchu (TW); Tsong-Pyng Perng, Hsinchu (TW)

(73) Assignee: NATIONAL APPLIED RESEARCH LABORATORIES, Hsinchu (TW)

( * ) Notice: Subject to any disclaimer, the term of this patent is extended or adjusted under 35 U.S.C. 154(b) by 93 days.

(21) Appl. No.: 15/156,916

(22) Filed: May 17, 2016

(65) Prior Publication Data
US 2016/0256863 A1   Sep. 8, 2016

Related U.S. Application Data

(62) Division of application No. 13/948,499, filed on Jul. 23, 2013, now Pat. No. 9,381,509.

(51) Int. Cl.
*B01J 19/00* (2006.01)
*B01J 19/24* (2006.01)
(Continued)

(52) U.S. Cl.
CPC .............. *B01J 37/024* (2013.01); *B01J 23/14* (2013.01); *B01J 23/38* (2013.01); *B01J 23/42* (2013.01);
(Continued)

(58) Field of Classification Search
CPC ........ B01J 19/00; B01J 19/0093; B01J 19/24; B01J 23/00; B01J 23/14; B01J 23/38;
(Continued)

(56) References Cited

U.S. PATENT DOCUMENTS

| 2004/0220434 | A1* | 11/2004 | Brophy ............... B01J 19/0093 568/959 |
| 2006/0127287 | A1* | 6/2006 | Hibst ................... B01J 19/0046 422/185 |

(Continued)

*Primary Examiner* — Natasha Young
(74) *Attorney, Agent, or Firm* — Chun-Ming Shih

(57) ABSTRACT

The present invention provides methods and designs of enclosed-channel reactor system for manufacturing catalysts or supports. Both of the configuration designs force the gaseous precursors and purge gas flow through the channel surface of reactor. The precursors will transform to thin film or particle catalysts or supports under adequate reaction temperature, working pressure and gas concentration. The reactor body is either sealed or enclosed for isolation from atmosphere. Another method using super ALD cycles is also proposed to grow alloy catalysts or supports with controllable concentration. The catalysts prepared by the method and system in the present invention are noble metals, such as platinum, palladium, rhodium, ruthenium, iridium and osmium, or transition metals such as iron, silver, cobalt, nickel and tin, while supports are silicon oxide, aluminum oxide, zirconium oxide, cerium oxide or magnesium oxide, or refractory metals, which can be chromium, molybdenum, tungsten or tantalum.

25 Claims, 6 Drawing Sheets

(51) Int. Cl.

| | | |
|---|---|---|
| *B01J 23/00* | (2006.01) | |
| *B01J 23/14* | (2006.01) | |
| *B01J 23/46* | (2006.01) | |
| *B01J 23/50* | (2006.01) | |
| *B01J 23/74* | (2006.01) | |
| *B01J 35/00* | (2006.01) | |
| *B01J 35/02* | (2006.01) | |
| *B01J 35/04* | (2006.01) | |
| *B01J 37/00* | (2006.01) | |
| *B01J 37/02* | (2006.01) | |
| *B01J 37/04* | (2006.01) | |
| *H01M 4/92* | (2006.01) | |
| *B01J 23/38* | (2006.01) | |
| *B01J 23/42* | (2006.01) | |
| *B01J 23/40* | (2006.01) | |
| *B01J 23/48* | (2006.01) | |
| *B01J 23/70* | (2006.01) | |
| *H01M 4/00* | (2006.01) | |
| *H01M 4/86* | (2006.01) | |
| *H01M 4/90* | (2006.01) | |

(52) U.S. Cl.
CPC ............. *B01J 23/462* (2013.01); *B01J 23/50* (2013.01); *B01J 23/74* (2013.01); *B01J 35/04* (2013.01); *B01J 37/0201* (2013.01); *B01J 37/0228* (2013.01); *B01J 37/0244* (2013.01); *H01M 4/9016* (2013.01); *H01M 4/92* (2013.01)

(58) Field of Classification Search
CPC . B01J 23/40; B01J 23/42; B01J 23/462; B01J 23/48; B01J 23/50; B01J 23/70; B01J 23/74; B01J 35/00; B01J 35/02; B01J 35/04; B01J 37/00; B01J 37/02; B01J 37/0201; B01J 37/0228; B01J 37/024; B01J 37/0244; B01J 23/46; H01M 4/00; H01M 4/86; H01M 4/90; H01M 4/9016; H01M 4/92
See application file for complete search history.

(56) References Cited

U.S. PATENT DOCUMENTS

| | | | |
|---|---|---|---|
| 2011/0083997 A1* | 4/2011 | Silva | B01J 19/0093 208/60 |
| 2011/0124199 A1* | 5/2011 | Granneman | C23C 16/45551 438/758 |
| 2017/0175268 A1* | 6/2017 | Perng | C23C 16/45502 |

\* cited by examiner

ENCLOSED-CHANNEL REACTOR METHOD TO MANUFACTURE CATALYSTS OR SUPPORT MATERIALS

This application is a divisional of an application Ser. No. 13/948,499, filed on Jul. 23, 2013, now U.S. Pat No. 9,381,509, which is based on, and claims the priority benefit of Taiwan application no. 101143624, filed on Nov. 22, 2012. The contents of each of the above-mentioned patent applications is hereby incorporated by reference herein in its entirety and made a part of this specification.

BACKGROUND OF THE INVENTION

1. FIELD OF THE INVENTION

The present invention presents a method based on chemical vapor deposition reactions, particularly an enclosed-channel reactor system and a method to manufacture catalysts or support materials on the basis of atomic layer deposition (ALD).

2. DESCRIPTION OF THE PRIOR ART

Catalysts are typically applied to increase reaction rate in various processes with less energy consumption, such as fuel cells and hydrogen production by water splitting. Improving the surface area between gas phase and catalyst would be a key factor to improve the reaction rate. Therefore, to obtain well-dispersed and nanoscaled catalysts with large specific area is crucial for catalytic reactions.

The catalytic reaction can be depicted as shown in FIG. 1(a). With the help of catalyst, reactant A will be transformed to product B in a faster and energy-efficient way. In order to prevent the participation of unwanted elements, the catalytic reaction is typically contained in the enclosed-channel reactor as shown in FIG. 1(b), where the reactant A will flow through. Accordingly, the catalyst should be coated on the inner surface of channel for the catalytic reaction, as shown in FIG. 1(c). Furthermore, a thermally stable nanoscaled support, shown in FIG. 1(d), would be needed to prevent the clustering of nanoscaled catalyst, at elevated temperature, leading to reduction of surface area for catalytic reaction.

Conventionally, nanoscaled catalyst or support can be prepared by injecting liquid precursor into channels by compressed air, followed by heating at elevated temperatures. However, it is difficult to uniformly deposit the catalyst or support on channel surface with good dispersion due to restriction of channel shape or size and poor precursor liquidity. Powder metallurgy is an alternative to prepare catalyst and support by co-sintering the liquid precursor. However, only a limited amount of catalyst on the surface is available for catalytic reaction so that the utilization efficiency of catalyst is low. Therefore, it would be helpful to deposit well-dispersed nanoscaled catalyst or support on the channel surface.

Vapor deposition is considered to deposit catalyst or support material on the channel surface with a better dispersion. As shown in FIG. 2, the gaseous precursor would, however, tend to transport through peripheral path Q1 of a reactor body 12 rather than inner path Q2 due to the difference of gas conductance. The catalyst or support would tend to deposit on the surface along the outside path, which cannot serve as reaction area. Therefore, the utilization efficiency of catalyst grown by a conventional vapor deposition process would be low. Uses of extended injection duration and high concentration may lead to a thicker coating along path Q2, but the cost would increase significantly. Therefore, it is crucial to improve the coating of catalyst or support on the inner path Q2 with less consumption of precursor.

SUMMARY OF THE INVENTION

To improve coating uniformity with less consumption of precursors, the present invention utilizes vapor deposition technique with a capping mechanism to force the precursors and purge gas to flow through the inner path of an enclosed-channel reactor.

The present invention is intended to use chemical vapor deposition for preparation of catalyst, support or their mixture in an enclosed-channel reactor. Precursors of catalyst or support are injected into the channels of the reactor body through the inlet cap and removed from the outlet cap. Nitrogen, hydrogen or inert gas (helium, neon, or argon) is typically applied as a carrier gas to transfer less-volatile precursors into the channels. The precursors will transform to catalyst or support under adequate reaction temperature, working pressure, and gas concentration.

The present invention is also intended to use atomic layer deposition for preparation of catalyst, support material or their mixture in an enclosed-channel reactor. The first and second precursors of catalyst or support are separately and alternatively injected into the inlet cap and removed from the outlet cap, between which a large amount of nitrogen, hydrogen or inert gas (helium, neon, or argon) is introduced as a purge gas to remove unreacted precursor and byproduct. The first and second precursors are called A and B, respectively, while the purge gas is called P. The sequential injection of A-P-B-P steps compose an ALD cycle. By repeating the ALD cycles, precursors will transform to catalyst or support under adequate reaction temperature, working pressure and gas concentration.

The present invention of an enclosed-channel reactor system comprises a reactor body as well as an inlet cap and an outlet cap. The reactor body with a cylindrical or polygonal contour has a plurality of channels inside, which act as the surface for catalytic reaction. The inlet cap connects with the reactor body at the upstream side of gas flow and has conduit linking to the channels. The outlet cap has conduit linking to the channels at the downstream side of gas flow and connects to a vacuum pump. Both contacts of inlet and outlet caps with the reactor body are sealed with an elastomer O-ring to achieve isolation from the atmosphere.

The present invention of an alternative enclosed-channel reactor system comprises a reactor body as well as a reactor enclosure and a reactor cap. The reactor body with a cylindrical or polygonal has a plurality of channels inside, which act as the surface for catalytic reaction. The reactor enclosure that externally encloses the reactor body is connected to a reactor cap which is either at the upstream side or downstream side of gas flow. The contact between inlet and outlet caps is sealed with an elastomer O-ring to achieve isolation from the atmosphere.

In the present invention, inner channels in each of the above reactors can be coated with catalyst, including noble metals, such as platinum, palladium, rhodium, ruthenium, iridium and osmium, or transition metals, such as iron, silver, cobalt, nickel and tin; or support materials, including silicon oxide, aluminum oxide, zirconium oxide, cerium oxide, wherein the support materials are capable of resisting high temperature; or refractory metals, which can be chromium, molybdenum, tungsten, or tantalum.

Based on the above enclosed-channel reactors, the present invention also refers to a method for preparing catalyst or support material by using an ALD super cycle comprising two different ALD cycles. In the first ALD cycle, the first and second precursors of catalyst or support are separately and alternatively injected into the reactor, between which a large amount of nitrogen, hydrogen or inert gas (helium, neon, or argon) is introduced to remove unreacted precursor and byproduct. The first ALD cycle is composed of sequential injection of A-P-B-P steps. In the second ALD cycle, the first precursor A is replaced by a third precursor A'. The second ALD cycle is therefore composed of sequential injection of A'-P-B-P steps.

In the present invention, both of the first and second ALD cycles can be used to grow catalyst, including noble metals, such as platinum, palladium, rhodium, ruthenium, iridium and osmium, or transition metals, such as iron, silver, cobalt, nickel and tin; or support materials, including silicon oxide, aluminum oxide, zirconium oxide, cerium oxide; or refractory metals which can be chromium, molybdenum, tungsten, or tantalum.

In the above mentioned method using an ALD super cycle, the A-P-B-P and A'-P-B-P ALD cycles are repeated N and M times, respectively, to form an alloy catalyst or support. Furthermore, the composition can be controlled by using an optimum ratio, N/(N+M), under adequate reaction temperature, working pressure and gas concentration.

These features and advantages of the present invention will be fully understood and appreciated from the following detailed description of the accompanying Drawings.

DETAILED DESCRIPTION OF THE PREFERRED EMBODIMENT

Figure 1:
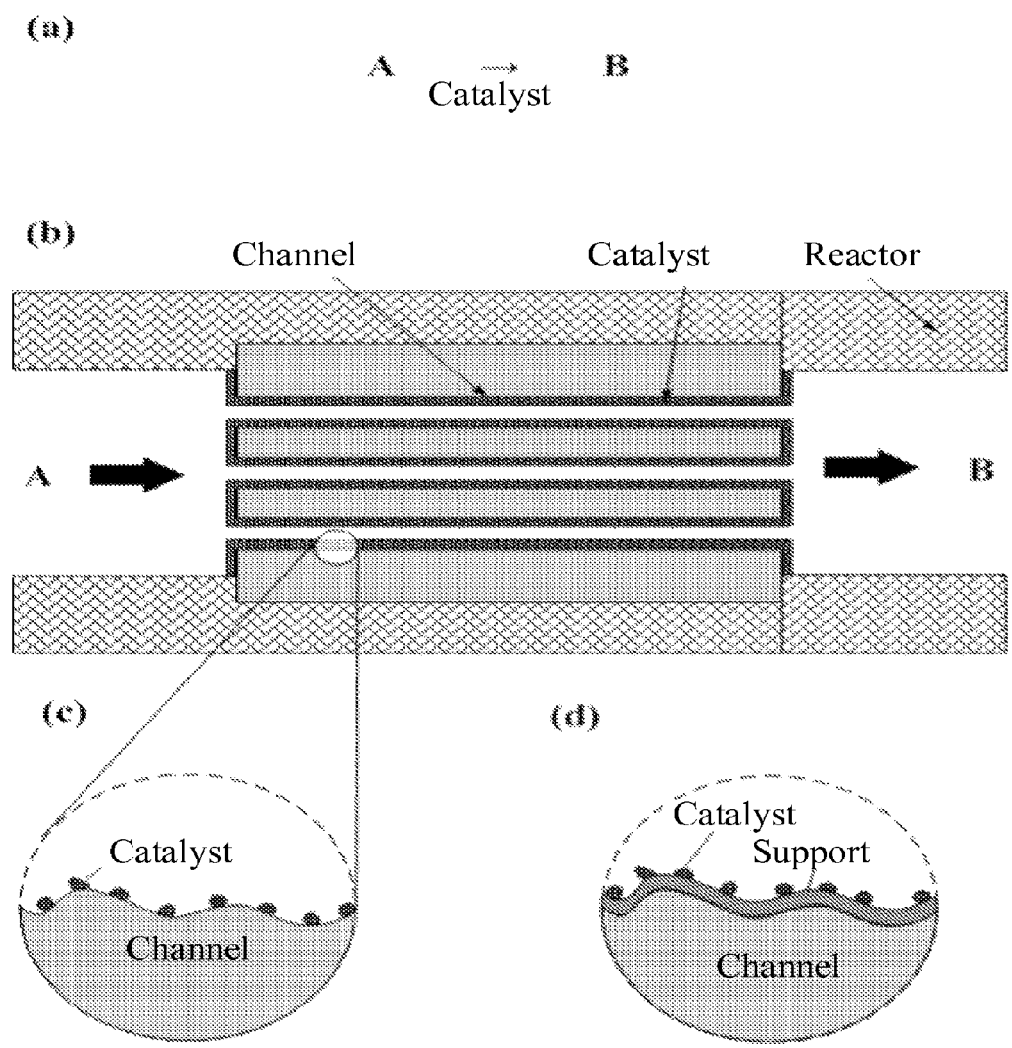
FIG. 1 is (a) an illustration of catalytic reaction, (b) a schematic view of enclosed-channel reactor and enlarged views of channel surface with (c) catalyst and (d) support/catalyst.
Figure 2:
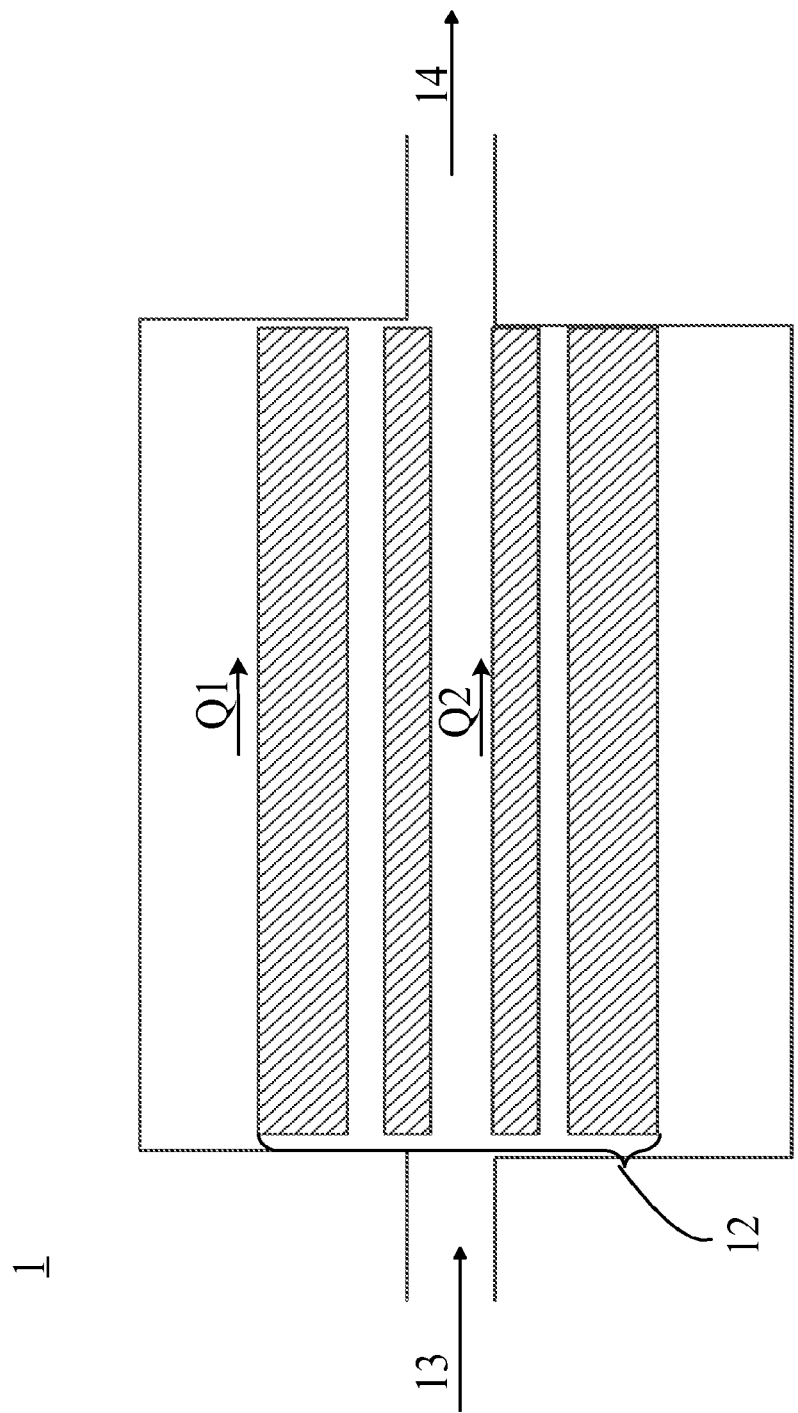
FIG. 2 is a schematic view of a deposition chamber for deposition of catalyst or support material on the channel surface of a conventional enclosed reactor.
Figure 3:
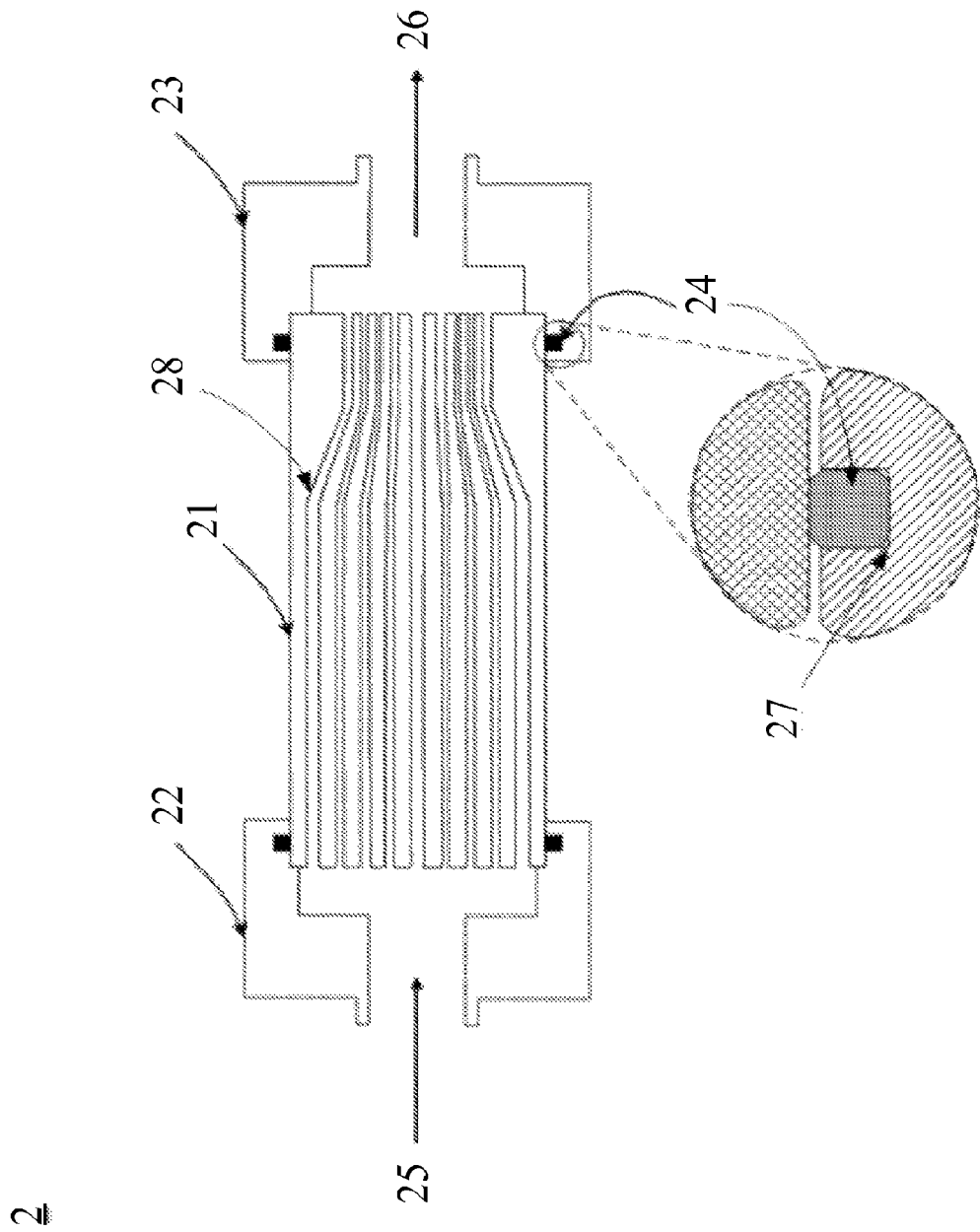
FIG. 3 is a schematic view of the present invention of an enclosed-channel reactor system.

An enclosed-channel reactor system 2 in the present invention, as shown in FIG. 3, comprises a reactor body 21, an inlet cap 22 and an outlet cap 23. The reactor body 21 with a cylindrical or polygonal contour has a plurality of channels 28 inside, which act as the surface for catalytic reaction. The inlet cap 22 connects with the reactor body 21 at the upstream side 25 of gas flow and has conduit linking to the channels 28. The outlet cap has conduit linking to the channels of reactor body 21 at the downstream side 26 of gas flow and to a vacuum pump on the other side. Both inlet cap 22 and outlet cap 23 contact the reactor body with an elastomer O-ring 24 stuffed into a groove 27 for isolation from the atmosphere, as shown in FIG. 3.

Figures 4A, 4B:
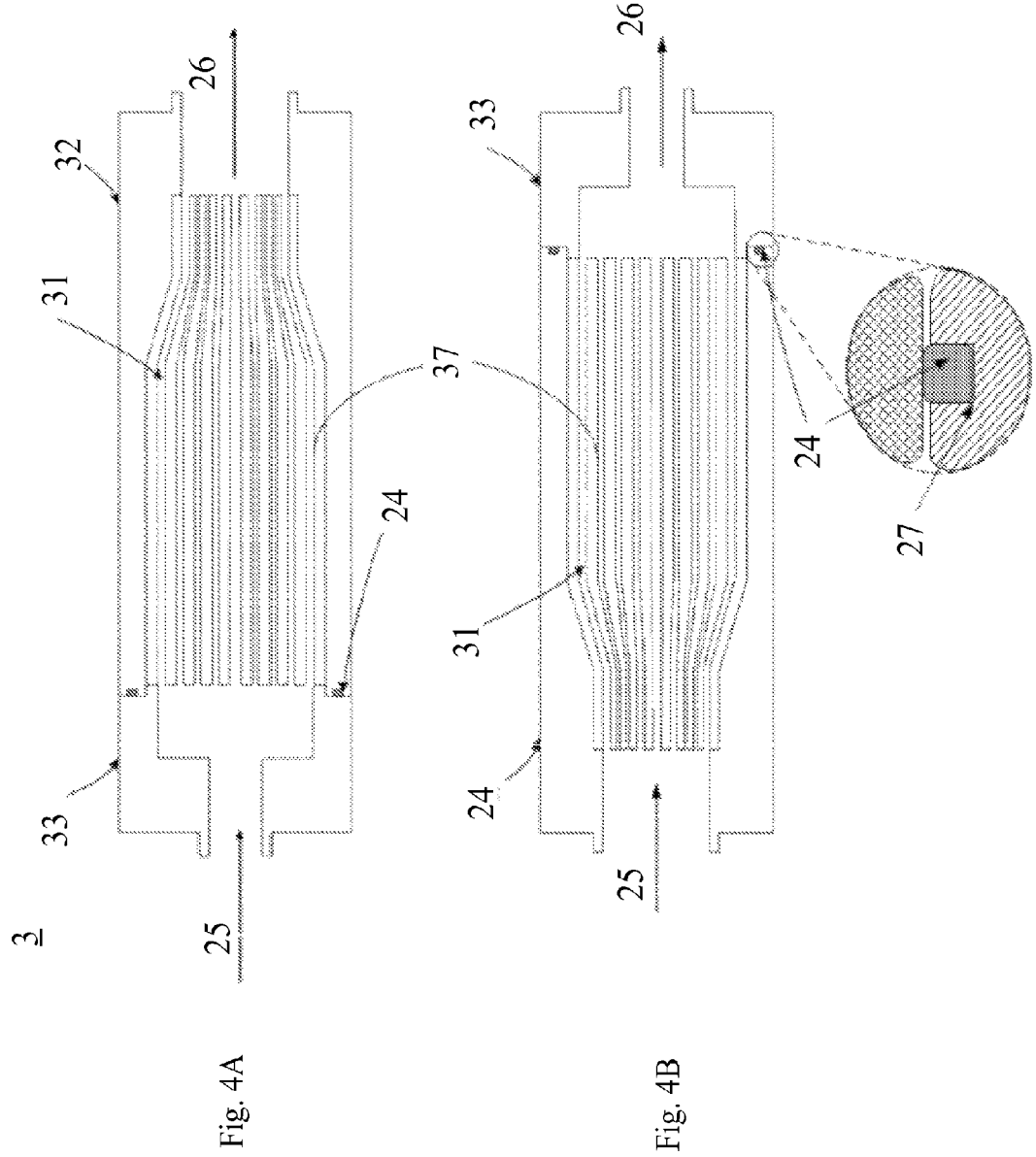
FIG. 4A is a schematic view of the present invention of an enclosed-channel reactor system.
FIG. 4B is a schematic view of the present invention of an enclosed-channel reactor system.

Another enclosed-channel reactor system 3 in the present invention, as shown in FIG. 4, comprises a reactor body 31, a reactor enclosure 32 and a reactor cap 33. The reactor body 31 with a cylindrical or polygonal contour has a plurality of channels 37 inside, which act as the surface for catalytic reaction. The reactor enclosure 32 externally encloses the reactor body is connected to a reactor cap 33, which is either at the upstream side 25 or downstream side 26 of gas flow, as shown in FIGS. 4A and 4B. The contact between reactor enclosure 32 and reactor cap 33 is sealed with an elastomer O-ring 24 stuffed into a groove 27 to achieve isolation from the atmosphere.

Figure 5:
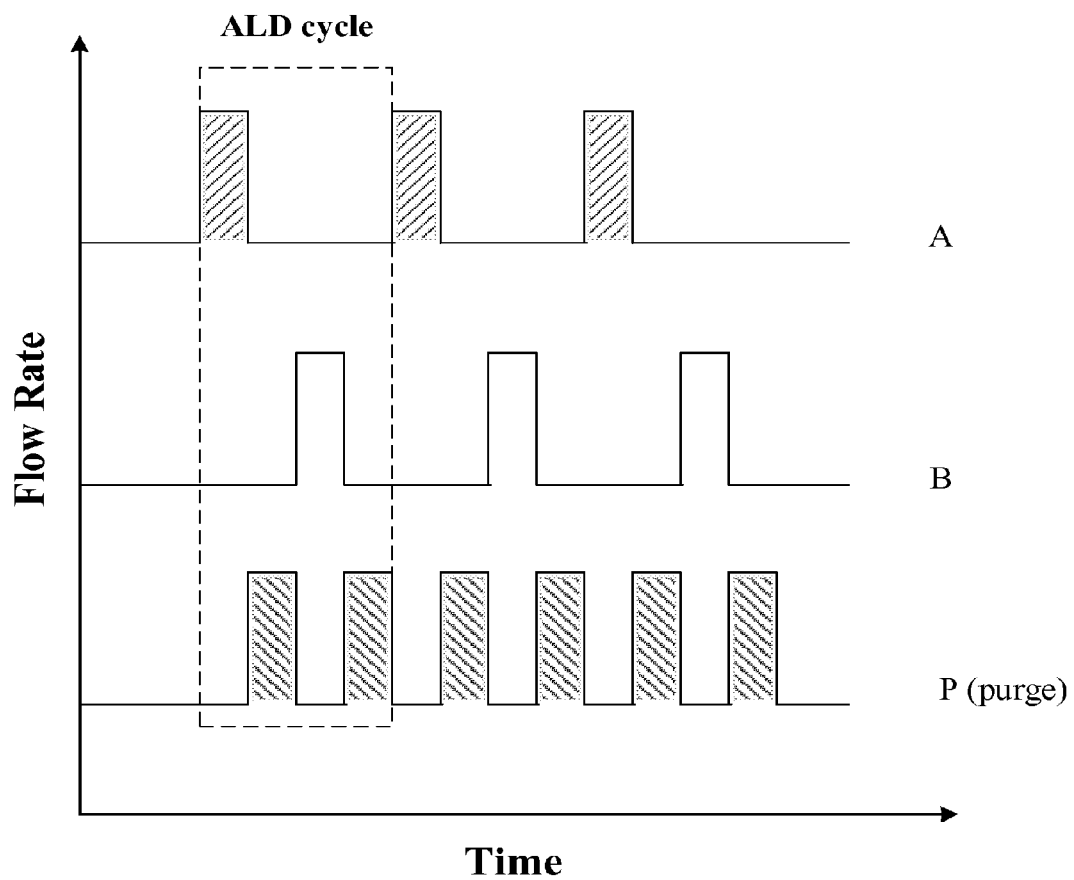
FIG. 5 is a schematic view illustrating an ALD cycles.

FIG. 5 shows the flow rates of precursors A and B and purge gas P versus time in the ALD cycle of the present invention. A suitable number of A-P-B-P ALD cycles are chosen for controlling the size of catalyst or support to obtain optimal catalyst efficiency.

Based on the above steps, 100 Å thick aluminum oxide support is deposited on the channel surface of the enclosed-channel reactor system 2 by using 100 ALD cycles at 200° C. Aluminum chloride, aluminum bromide or trimethylaluminum (TMA) is used as the first precursor while water is used as the second precursor.

Based on the above steps, 60 Å thick titanium dioxide catalyst is first deposited on the channel surface of the enclosed-channel reactor system 2 by using 100 ALD cycles at 200° C. Titanium tetrachloride and water are used as the first and second precursors, respectively. Secondly, platinum nanoparticles with a diameter of 40 Å are grown as a co-catalyst on the above titanium dioxide film by using 100 ALD cycles. Organoplatinum precursor (MeCpPtMe$_3$) and oxygen are used as first and second precursors, respectively.

Figure 6:
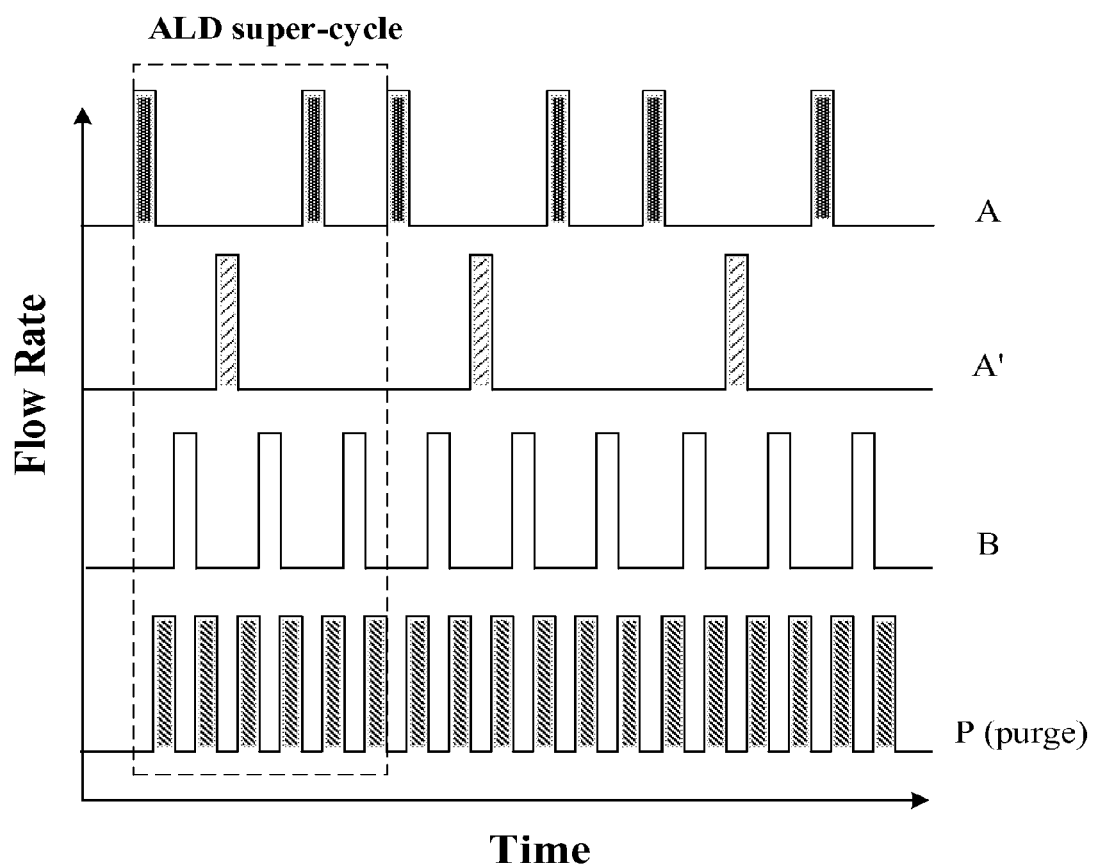
FIG. 6 is a schematic view illustrating a super ALD super-cycles.

FIG. 6 shows a typical relationship of flow rates of precursor A, A', and B and purge gas P versus time in the ALD super-cycle of the present invention, containing two A-P-B-P cycles and one A'-P-B-P cycle. Furthermore, the numbers of A-P-B-P and A'-P-B-P, N and M, in the ALD-cycle can be changed for controlling the composition of alloy catalyst or support to obtain optimal catalyst efficiency.

Based on the above steps, 100 Å thick aluminum oxide support is first deposited on the channel surface of the enclosed-channel reactor system 2 by using 100 ALD cycles at 200° C. in which trimethylaluminum and water are used as the first and second precursors, respectively. Secondly, PtRu$_4$ alloy catalyst particles with a diameter of 40 Å are grown as catalyst on the above aluminum oxide film by using an ALD super-cycle consisting of 5 sub-cycles of A-P-B-P and 20 sub-cycles of A'-P-B-P in which an organoplatinum precursor (MeCpPtMe$_3$), a ruthenium complex (Ru(Cp)$_2$) and oxygen are taken as precursor A, precursor A' and precursor B, respectively.

Methods and designs of enclosed-channel reactor system for manufacturing catalyst or support in the present invention have the features in contrast to prior arts.

1. Catalyst and support material are assured to deposit on surface of channels by means of a forced gas flow passing through enclosed channels.

2. Size of catalyst or support material, and composition of materials to be mixed are controlled by using different numbers of ALD cycles and ratios N/(N+M) in an ALD super cycle, respectively.

The present invention provides a better reactor design and method to improve the utilization efficiency and reduce consumption and manufacturing cost of catalyst.

What is claimed is:

1. A method based on an enclosed-channel reactor system for manufacture of catalysts or support materials, said system comprising a reactor body provided with a plurality of enclosed channels inside, an inlet cap connecting with the said reactor body at the upstream side and having an inlet end which links enclosed channels in said reactor body, and an outlet cap connecting with the said reactor body at the downstream side and having an outlet end which links enclosed channels in said reactor body, said method comprising steps as follows:

injecting precursors of catalyst or support materials into said enclosed channels of said reactor body through said inlet end;

injecting an inert gas via said inlet end to purge said enclosed channels and discharged from said outlet end for diluting or removing said residual precursors; and completing deposition in said enclosed channels of said reactor body for preparation of catalysts or support materials.

2. The method based on said enclosed-channel reactor system for manufacture of catalysts or support materials according to claim 1, wherein said precursors are compounds of noble metals or transition metals.

3. The method based on said enclosed-channel reactor system for manufacture of catalysts or support materials according to claim 2, wherein said noble metals comprise platinum, palladium, rhodium, ruthenium, iridium or osmium.

4. The method based on said enclosed-channel reactor system for manufacture of catalysts or support materials according to claim 2, wherein said transition metals comprise iron, silver, cobalt, nickel, or tin.

5. The method based on said enclosed-channel reactor system for manufacture of catalysts or support materials according to claim 1, wherein said support materials are one oxide which is capable of resisting high temperature.

6. The method based on said enclosed-channel reactor system for manufacture of catalysts or support materials according to claim 5, wherein said oxide which is capable of resisting high temperature is silicon oxide, aluminum oxide, zirconium oxide, cerium oxide.

7. The method based on said enclosed-channel reactor system for manufacture of catalysts or support materials according to claim 1, wherein said support materials are refractory metals.

8. The method based on said enclosed-channel reactor system for manufacture of catalysts or support materials according to claim 7, wherein said refractory metal is chromium, molybdenum, tungsten or tantalum.

9. The method based on said enclosed-channel reactor system for manufacture of catalysts or support materials according to claim 1, wherein said inert gas is helium, neon or argon.

10. A method based on an enclosed-channel reactor system for manufacture of catalysts or support materials, said system comprising a reactor body provided with a plurality of enclosed channels inside, a reactor enclosure externally capping said reactor body, allowing one end to be adjacent to one end of said reactor body, and having an outlet end shared by said enclosed channels, and a reactor cap which has one end linking said reactor enclosure's other end in order to seal said reactor cap and said reactor enclosure and the other end on which there is an inlet end linking said enclosed channels in said reactor body, said method comprising steps as follows:

injecting precursors of catalysts or support materials into said enclosed channels of said reactor body through said inlet end;

injecting an inert gas via said inlet end to purge said enclosed channels and discharged from said outlet end for diluting or removing said residual precursors; and completing deposition in said enclosed channels of said reactor body for growth of catalysts or support materials.

11. The method based on said enclosed-channel reactor system for manufacture of catalysts or support materials according to claim 10, wherein said precursors are compounds of noble metals or transition metals.

12. The method based on said enclosed-channel reactor system for manufacture of catalysts or support materials according to claim 11, wherein said noble metals comprise platinum, palladium, rhodium, ruthenium, iridium, or osmium.

13. The method based on said enclosed-channel reactor system for manufacture of catalysts or support materials according to claim 11, wherein said transition metals comprise iron, silver, cobalt, nickel, or tin.

14. The method based on said enclosed-channel reactor system for manufacture of catalysts or support materials according to claim 10, wherein said support materials are one oxide which is capable of resisting high temperature.

15. The method based on said enclosed-channel reactor system for manufacture of catalysts or support materials according to claim 14, wherein said oxide which is capable of resisting high temperature is silicon oxide, aluminum oxide, zirconium oxide, cerium oxide.

16. The method based on said enclosed-channel reactor system for manufacture of catalysts or support materials according to claim 10, wherein said support materials are one refractory metal.

17. The method based on said enclosed-channel reactor system for manufacture of catalysts or support materials according to claim 16, wherein said refractory metal is chromium, molybdenum, tungsten or tantalum.

18. The method based on said enclosed-channel reactor system for manufacture of catalysts or support materials according to claim 10, wherein said inert gas is helium, neon or argon.

19. A method based on an enclosed-channel reactor system for manufacture of catalysts or support materials, said system comprising a reactor body provided with a plurality of enclosed channels inside, a reactor enclosure externally capping said reactor body, allowing one end to be adjacent to one end of said reactor body, and having an outlet end shared by said enclosed channels, and a reactor cap which has one end linking said reactor enclosure's other end in order to seal said reactor cap and said reactor enclosure and the other end on which there is an inlet end linking said enclosed channels in said reactor body, said method being on the basis of an ALD cycle with steps as follows:

injecting a first precursor into said enclosed channels of said reactor body through said inlet end;

injecting an inert gas via said inlet end to purge said enclosed channels and discharged from said outlet end for diluting or removing said residual first precursor;

injecting a second precursor into said enclosed channels of said reactor body through said inlet end; and injecting another inert gas via said inlet end to purge said enclosed channels and discharged from said outlet end for diluting or removing said residual second precursor.

20. The method based on said enclosed-channel reactor system for manufacture of catalysts or support materials according to claim 19, wherein said inert gas is helium, neon or argon.

21. The method based on said enclosed-channel reactor system for manufacture of catalysts or support materials according to claim 19, wherein said the thickness increase of catalysts or support materials is 0.5~1.5Å after one cycle ALD reaction, and the growth rate of deposited catalyst or support material is linearly and positively proportional to cycle number of ALD.

22. A method based on said enclosed-channel reactor system for manufacturing catalysts or support materials, said system comprising a reactor body provided with a plurality of enclosed channels inside, a reactor enclosure externally capping said reactor body, allowing one end to be adjacent to one end of said reactor body, and having an outlet end shared by said enclosed channels, and a reactor cap which has one end linking said reactor enclosure's other end in order to seal said reactor cap and said reactor enclosure and the other end on which there is an inlet end linking said enclosed channels in said reactor body, said method being on the basis of an ALD super-cycle with steps as follows:

a first cycle:
  a. injecting a first precursor into said enclosed channels of said reactor body through said inlet end;
  b. injecting an inert gas via said inlet end to purge said enclosed channels and discharged from said outlet end for diluting or removing said residual first precursor;
  c. injecting a second precursor into said enclosed channels of said reactor body through said inlet end;
  d. injecting an inert gas via said inlet end to purge said enclosed channels and discharged from said outlet end for diluting or removing said residual second precursor; and a second cycle:
  e. injecting a third precursor into said enclosed channels of said reactor body through said inlet end;
  f. injecting another inert gas via said inlet end to purge said enclosed channels and discharged from said outlet end for diluting or removing said residual third precursor;
  g. injecting a second precursor into said reactor body through said inlet end;
  h. injecting an inert gas via said inlet end to purge said enclosed channels and discharged from said outlet end for diluting or removing said residual second precursor;

wherein said first cycle and said second cycle for growth of catalysts or support materials are conducted N and M times, respectively.

23. The method based on said enclosed-channel reactor system for manufacturing catalysts or support materials according to claim 22, wherein said inert gas is helium, neon or argon.

24. The method based on said enclosed-channel reactor system for manufacturing catalysts or support materials according to claim 22, wherein said first cycle and said second cycle in which there are steps alternately or repeatedly practiced are conducted N and M times, respectively.

25. The method based on said enclosed-channel reactor system for manufacturing catalysts or support materials according to claim 22, wherein said first cycle and said second cycle, which comprise steps alternately or repeatedly conducted N and M times respectively, are able to control said composition of catalysts.

* * * * *